United States Patent
Bisognin et al.

(10) Patent No.: US 7,384,060 B2
(45) Date of Patent: Jun. 10, 2008

(54) METHOD FOR PRODUCING A FINISHED PART COMPRISING A ZONE DESIGNED TO ALLOW A PASSAGEWAY TO BE CREATED, AND FINISHED PART AND ASSEMBLY THEREBY PRODUCED

(75) Inventors: Julien Bisognin, Andeville (FR); Ivan Baudouin, Paris (FR); Jean-Louis Lanard, Feucherolles (FR)

(73) Assignee: Allibert Industrie, Nanterre (FR)

( * ) Notice: Subject to any disclaimer, the term of this patent is extended or adjusted under 35 U.S.C. 154(b) by 819 days.

(21) Appl. No.: 10/372,103

(22) Filed: Feb. 25, 2003

(65) Prior Publication Data

US 2003/0127836 A1 Jul. 10, 2003

Related U.S. Application Data

(62) Division of application No. 09/142,585, filed as application No. PCT/FR98/00064 on Jan. 14, 1998, now Pat. No. 6,524,505.

(30) Foreign Application Priority Data

Jan. 20, 1997 (FR) .................................. 97 00550

(51) Int. Cl.
 *B60R 21/20* (2006.01)
 *B60R 21/205* (2006.01)
(52) U.S. Cl. .................................. 280/728.3; 280/732
(58) Field of Classification Search ............. 280/728.3, 280/732
 See application file for complete search history.

(56) References Cited

U.S. PATENT DOCUMENTS

| 5,082,310 A | * | 1/1992 | Bauer ......................... 280/732 |
| 5,121,942 A | | 6/1992 | Warnick et al. |
| 5,131,678 A | * | 7/1992 | Gardner et al. ............. 280/732 |
| 5,362,096 A | * | 11/1994 | Satoh et al. ............. 280/728.3 |
| 5,375,874 A | * | 12/1994 | Zushi ....................... 280/728.3 |
| 5,390,950 A | * | 2/1995 | Barnes et al. ............ 280/728.3 |

(Continued)

FOREIGN PATENT DOCUMENTS

DE 19617874 10/1996

(Continued)

*Primary Examiner*—Eric Culbreth
*Assistant Examiner*—Barry Gooden, Jr.
(74) *Attorney, Agent, or Firm*—Rothwell, Figg, Ernst & Manbeck P.C.

(57) ABSTRACT

The invention relates to a facia panel for allowing an inflated airbag to pass through. In accordance with the invention, a composite finished part includes a support element made of plastic and having a reduced thickness in comparison to its other dimensions, and a connecting sheet joined to the support element and not extending over the whole surface of the support element. The part presents a special zone which forms a door for an airbag and is designed to make it possible to create a passageway for the airbag. The zone is delimited by a periphery constituted by an embrittled portion presenting two extremities and by an articulating portion which defines, between the two extremities, a articulation axis overlapped by the connecting sheet. The connecting sheet is present over the greater part of the special zone present, along at least the major part of the embrittled portion end on either side of the embrittled portion, and encompassed in the support element.

10 Claims, 4 Drawing Sheets

U.S. PATENT DOCUMENTS

| | | | |
|---|---|---|---|
| 5,393,088 A * | 2/1995 | Bauer et al. | 280/728.2 |
| 5,395,668 A | 3/1995 | Ito et al. | |
| 5,451,075 A | 9/1995 | Parker et al. | |
| 5,456,487 A | 10/1995 | Daris et al. | |
| 5,487,558 A * | 1/1996 | Ball et al. | 280/728.3 |
| 5,564,733 A | 10/1996 | Duenas et al. | |
| 5,611,564 A * | 3/1997 | Bauer | 280/728.3 |
| 5,698,283 A | 12/1997 | Yamasaki et al. | |
| 5,941,558 A * | 8/1999 | Labrie et al. | 280/728.3 |
| 5,992,876 A * | 11/1999 | Gray | 280/728.3 |
| 5,997,030 A * | 12/1999 | Hannert et al. | 280/728.3 |
| 6,012,735 A * | 1/2000 | Gray et al. | 280/728.2 |
| 6,203,056 B1 * | 3/2001 | Labrie et al. | 280/728.3 |
| 6,250,669 B1 * | 6/2001 | Ohmiya | 280/732 |
| 6,457,738 B1 * | 10/2002 | Labrie et al. | 280/728.3 |
| 6,467,800 B1 * | 10/2002 | Bey et al. | 280/728.3 |
| 6,485,047 B2 * | 11/2002 | Belanger et al. | 280/728.2 |
| 6,753,057 B1 * | 6/2004 | Gardner, Jr. | 428/43 |
| 6,896,310 B1 * | 5/2005 | Trappe et al. | 296/70 |
| 2002/0125699 A1 * | 9/2002 | Belanger et al. | 280/732 |
| 2002/0153710 A1 * | 10/2002 | Gray et al. | 280/728.3 |
| 2003/0011178 A1 * | 1/2003 | Choi et al. | 280/732 |
| 2003/0047916 A1 * | 3/2003 | Sun et al. | 280/728.3 |
| 2003/0047917 A1 * | 3/2003 | Streck | 280/728.3 |
| 2003/0085555 A1 * | 5/2003 | Segura | 280/728.3 |
| 2003/0127836 A1 * | 7/2003 | Bisognin et al. | 280/728.3 |
| 2003/0218318 A1 * | 11/2003 | Ono | 280/728.3 |
| 2004/0183280 A1 * | 9/2004 | Gray et al. | 280/728.3 |
| 2005/0110252 A1 * | 5/2005 | Geum | 280/732 |
| 2005/0167954 A1 * | 8/2005 | Gray et al. | 280/728.3 |

FOREIGN PATENT DOCUMENTS

| | | |
|---|---|---|
| EP | 0748722 | 12/1996 |
| EP | 0749872 | 12/1996 |
| FR | 2725950 | 4/1996 |
| WO | 96 30232 | 10/1996 |

* cited by examiner

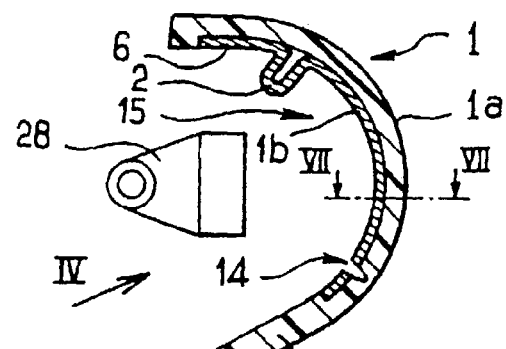
FIG_3
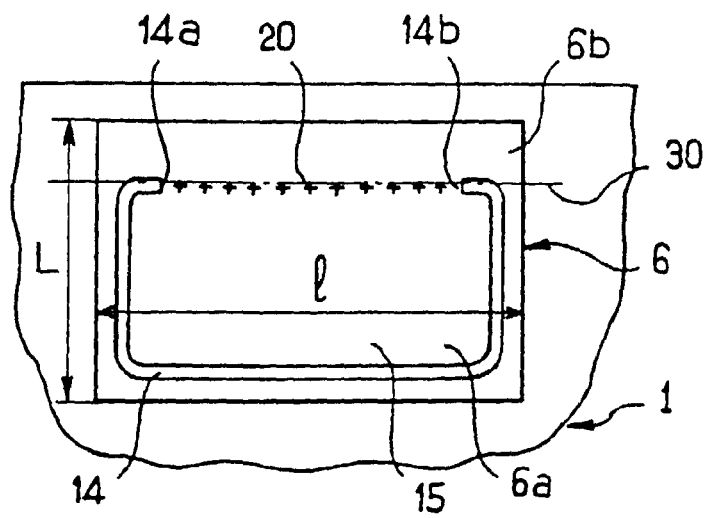
FIG_4
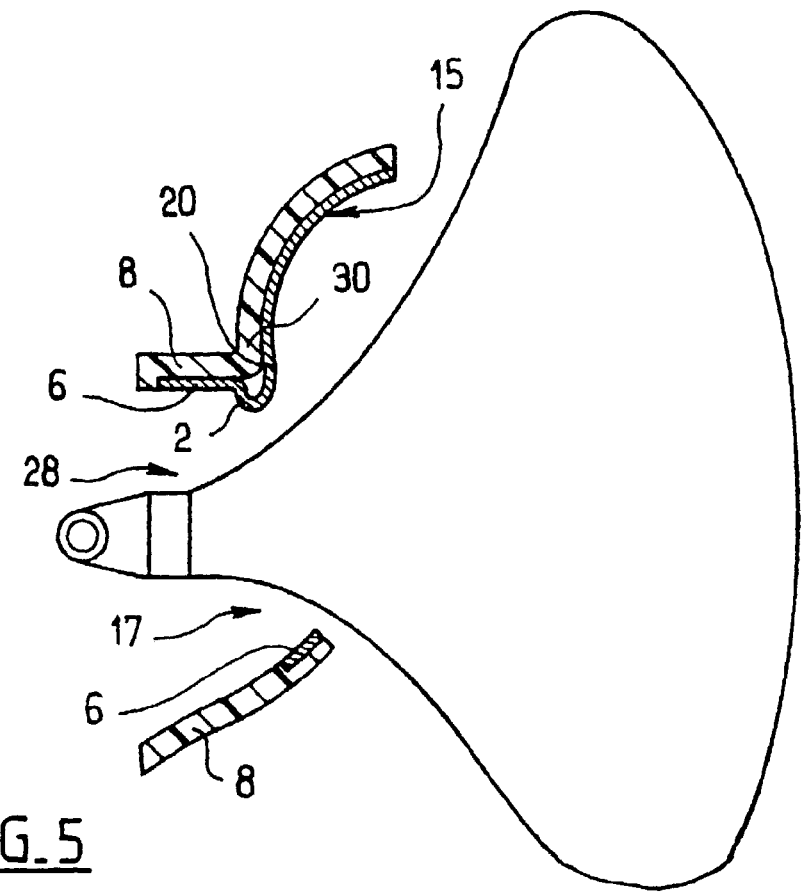
FIG_5

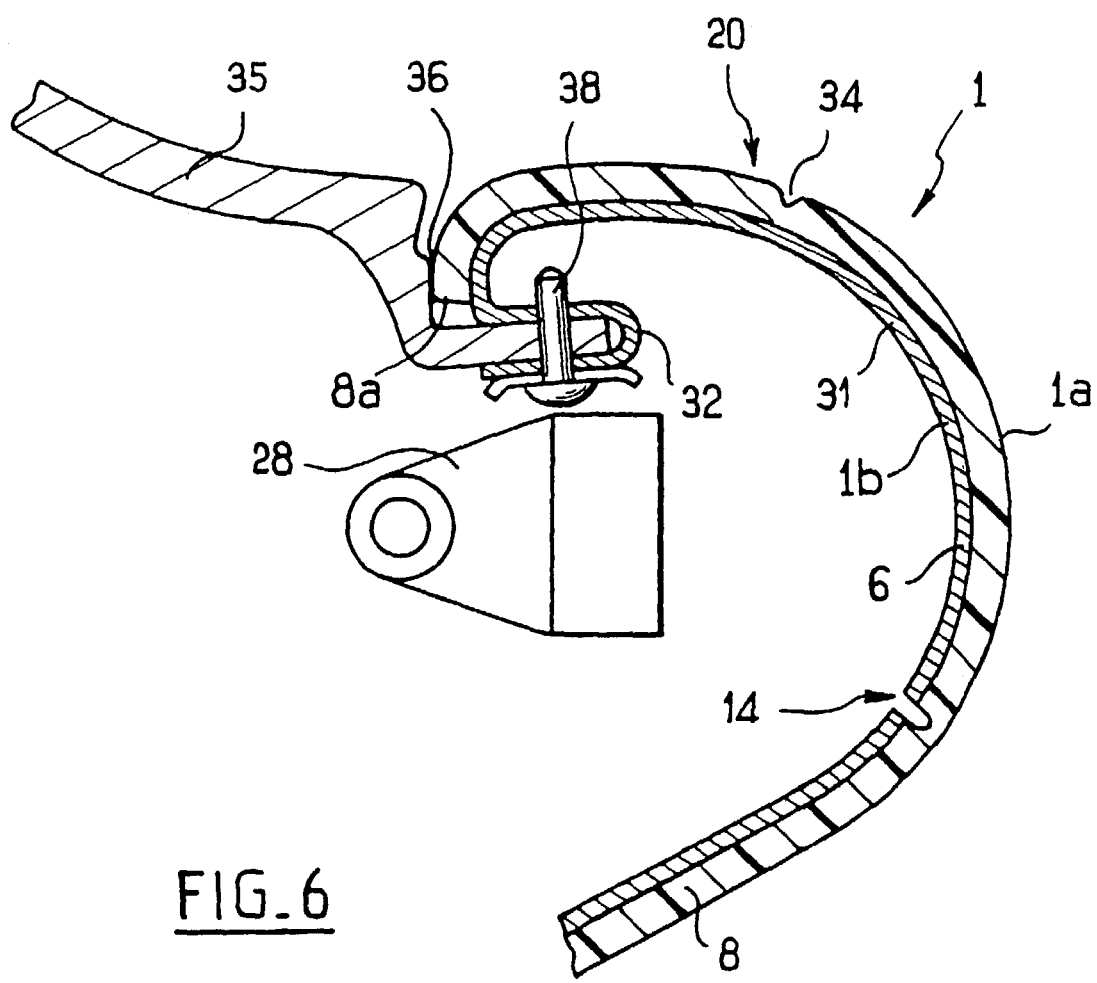
FIG_6
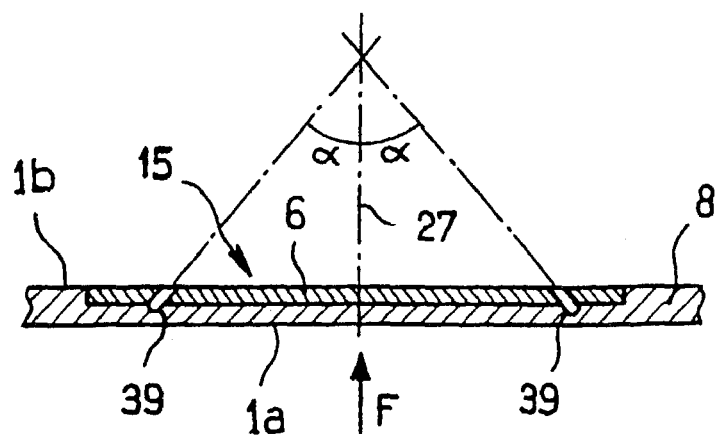
FIG_7

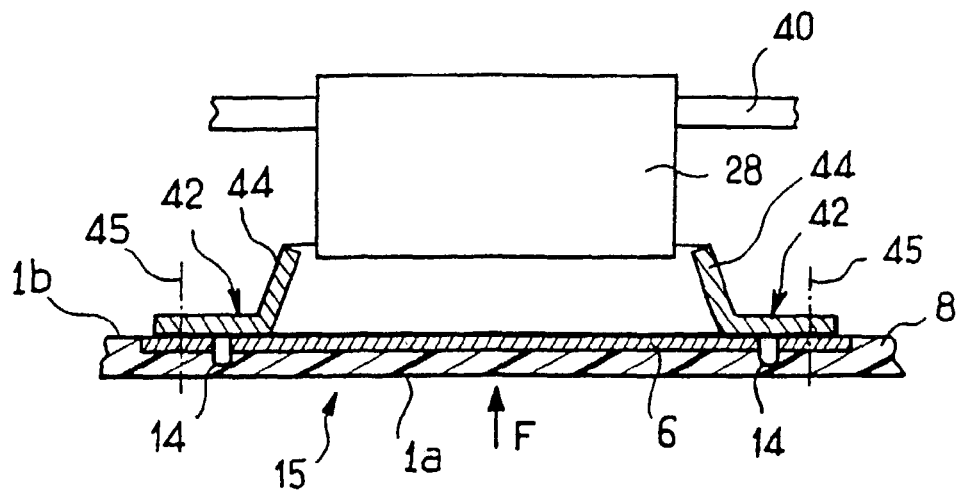
FIG_8
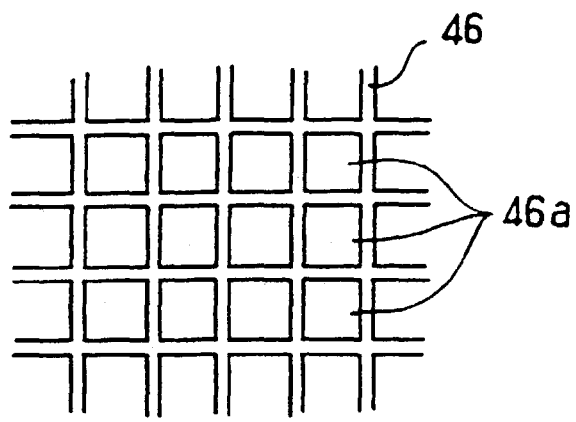
FIG_9
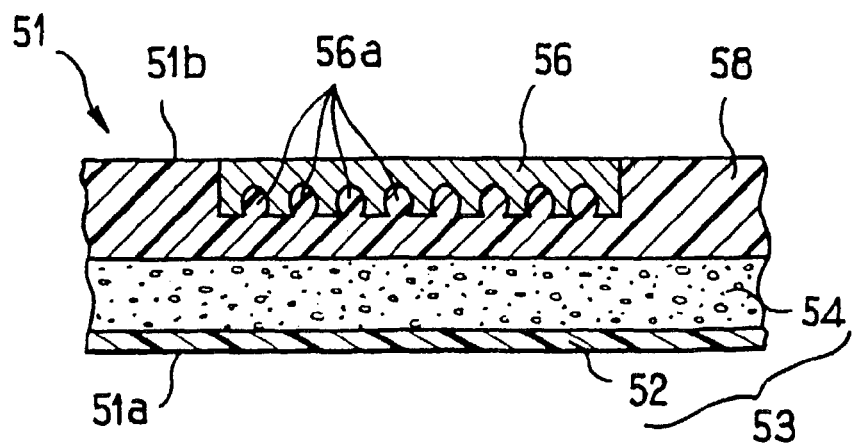
FIG_10

METHOD FOR PRODUCING A FINISHED PART COMPRISING A ZONE DESIGNED TO ALLOW A PASSAGEWAY TO BE CREATED, AND FINISHED PART AND ASSEMBLY THEREBY PRODUCED

CROSS-REFERENCE OF RELATED APPLICATIONS

This application is a divisional of U.S. application Ser. No. 09/142,585, filed Jun. 3, 1999, which is a national stage application under 35 U.S.C. § 371 of application No. PCT/FR98/00064, filed Jan. 14, 1998, and claims priority thereto.

BACKGROUND OF THE INVENTION

1. Field of the Invention

The invention relates to a method for producing a finished part comprising a zone which forms a door for an airbag and is designed to allow a passageway for the airbag to be created, as well as to such a part and to an assembly comprising the part.

More particularly the invention has applications in the field of automotive interior design, where it is especially relevant to the production of facia panels and door panels.

2. Description of the Prior Art

The object of the invention is to find a straightforward, reliable and inexpensive way of producing durable and reliable parts that enable a passageway to be created in a satisfactory manner.

In order to produce such a part, U.S. Pat. No. 5,395,668 and FR-B-2 725 950 disclose a method featuring the following steps: a) producing a part comprising a support element made from plastics material(s) which is of reduced thickness compared to its other dimensions, and a connecting sheet which extends substantially along the surface of said support element, b) incorporating in the part the special zone which forms a door delimited by a periphery constituted by an embrittled portion which has been mechanically weakened between two extremities and by an articulating portion which defines, between said two extremities, an articulation axis overlapped by the sheet.

However, this method is not entirely satisfactory. In particular, as far as the airbag is concerned, opening the door gives rise to fractures and even cracks, which tend to propagate within the part. Since these fractures or cracks are not restricted to the articulating portion, there is a danger of fragments of said part breaking away and being projected at the occupants of the vehicle and injuring them. Furthermore, there is a dispersion of the force deployed by the airbag, requiring the airbag to exert very great pressures to succeed in opening up the door.

Although it would have been possible to employ quality materials that are able to withstand stresses without fracturing, this solution is nevertheless comparatively expensive.

SUMMARY OF THE INVENTION

In order to resolve this problem the invention proposes that the connecting sheet employed presents a greater length and breadth than those of the special zone, and during stage b), the embrittled portion is produced in such a manner that the connecting sheet is present to either side of the embrittled portion along at least the major part of said portion, and that the connecting sheet is present over at least the greater part of the special zone.

Accordingly, the retaining sheet is arranged in that section of the part which shows the greatest tendency to fracture on account of the mechanical stresses, and catches any fragments.

The function of the connecting sheet in the present invention is therefore different from those in U.S. Pat. No. 5,395,668 and FR-B-2 725 950, where it acts as a reinforced articulation means. That is also why in those documents it is disposed near to the articulating portion.

Accordingly, if appropriate it would be possible to provide for a connecting sheet to be present over the major part of the door in order to catch the fragments, and to have a connecting sheet present in the vicinity of the articulating portion in order to reinforce the joint if the mechanical stresses involved called for this.

The length and breadth of the sheet represent its external dimensions perpendicularly and along the articulation axis, respectively.

According to one preferred application of the invention, during stage b), in at least part of the embrittled portion a cutout is simultaneously made in the sheet and the support is mechanically weakened by excising a part of its thickness.

This straightforward solution makes it possible on the one hand to quickly obtain a particularly efficient reinforcement of the support as far as the edge of the embrittled portion, and on the other hand to satisfactorily weaken said support mechanically, by precise positioning, relative to one another, of the cutout in the sheet and the mechanical weakening of the support. The cutout is preferably continuous and runs through the full thickness of the sheet, although this is not necessary.

In order to resolve the foregoing problems still more effectively and simply, the invention proposes during stage a), introducing the connecting sheet into a mould cavity, and introducing the plastics material into the mould cavity, said plastics material making contact with the sheet; during stage b), producing the embrittled portion in such a manner that it is wholly and strictly enclosed within the sheet.

Accordingly, the connecting sheet surrounds the perimeter (the entire periphery) of the door and covers the whole of the door. On either side of the embrittled portion the support is reinforced by the sheet over the whole of said portion. The moulding process makes it possible to produce the part in a straightforward and satisfactory manner, especially by making it possible to place the sheet in position easily, with the result that said sheet is present everywhere that it is desired to produce the cutout.

In order to obtain even better quality parts in a straightforward and reliable manner, the invention proposes: the use of a mould comprising a mould cavity, a female die, a male die and an insert adapted to be moved between a retracted position and an advanced position, said movable insert being inserted into a cavity in the male die, thereby producing a slot between it and the male die when the insert is in the retracted position and moving further away from the male die when it is displaced towards the advanced position; and during stage a), introducing the sheet into the mould cavity, with the movable insert advanced; then by retracting the movable insert a folded portion of the sheet is set in said slot; the plastics material is now introduced into the mould cavity.

In this manner a part is obtained wherein the sheet is in the form of a loop facing the articulating portion. The pivoting of the door about the articulation axis is thus facilitated by the excess length of the sheet formed by this loop. Moreover, the production of the support, its connection to the sheet and the accomplishment of this loop are all brought about in a single operation.

According to a further practical feature, the invention proposes during stage a), producing the part in such a way that the sheet is present over all or at least the majority of the part, perpendicularly to the articulation axis, attaching the part by fixing it to a body, and joining the sheet to the body.

The presence of the sheet over all or at least the majority of the part perpendicularly to the articulation axis considerably reduces the risk of fragments of the part being thrown off. The joint between the sheet and the body ensures that the part will continue to be retained in relation to the body, in so far as there is no danger that the inflexible sheet will fracture.

In order to facilitate the fixing, i.e. connection, of the sheet to the body, the invention proposes during stage a), sticking out a tongue of said sheet from the mould cavity, and joining said tongue of the sheet to the body.

A further object of the invention is a composite finished part. U.S. Pat. No. 5,395,668 and FR-B-2 725 950 describe a part comprising a support element made of plastic and having a reduced thickness compared to its other dimensions, a connecting sheet joined to the support element, said part featuring a special zone which forms a door for an airbag and is designed to allow the creation of a passageway, said zone being delimited by a periphery constituted by an embrittled portion having two extremities and an articulating portion which, between said two extremities, defines an articulation axis overlapped by the sheet.

However, this part presents the drawbacks outlined above. In order to overcome these drawbacks the invention proposes that along at least the major part of the embrittled portion the sheet should be present on either side of said portion, and that the sheet should cover the majority of the special zone.

According to another advantageous feature, the invention proposes that the sheet should extend, perpendicularly to the articulation axis, beyond the articulating portion and at least as far as the edge of the part.

This reduces the risk that the pressure exerted by the airbag on the door and the resulting inertia on said door will cause the fracture or at least the start of a fracture of the part in a direction perpendicular to the articulation axis.

The invention furthermore relates to an assembly incorporating the part. According to the invention this assembly is characterised by the fact that it additionally comprises a body onto which the part is fixed, and the sheet is joined to the body.

BRIEF DESCRIPTION OF THE DRAWINGS

The invention will become still clearer from the following description, referring to the accompanying drawings in which:

FIG. 3 illustrates, in situ, a finished part produced after the stages shown in FIGS. 1 and 2.

FIG. 4 is a view in the arrowed direction IV from FIG. 3.

FIG. 5 illustrates, in situ, the finished part from FIG. 3, following the inflation of an airbag.

FIG. 6 is a scaled-up view illustrating a variant of the finished part from FIG. 3.

FIG. 7 illustrates another variant of the finished part, in a sectional view in the arrowed direction VII-VII from FIG. 3.

FIG. 8 illustrates yet another variant of the finished part, in a sectional view in the arrowed direction VII-VII from FIG. 3.

FIG. 9 illustrates a variant of the connecting sheet.

FIG. 10 is a cross-section showing a finished part incorporating another variant of the connecting sheet.

DETAILED DESCRIPTION OF THE PREFERRED EMBODIMENTS

Figure 1:
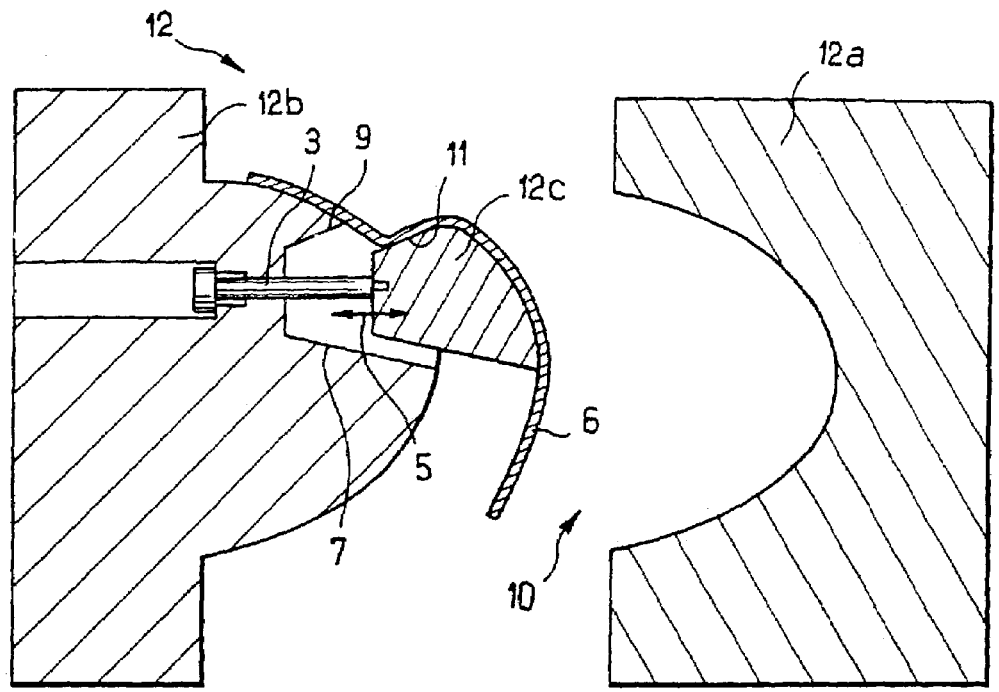
FIG. 1 illustrates a first stage of a method in accordance with the invention.
Figure 2:
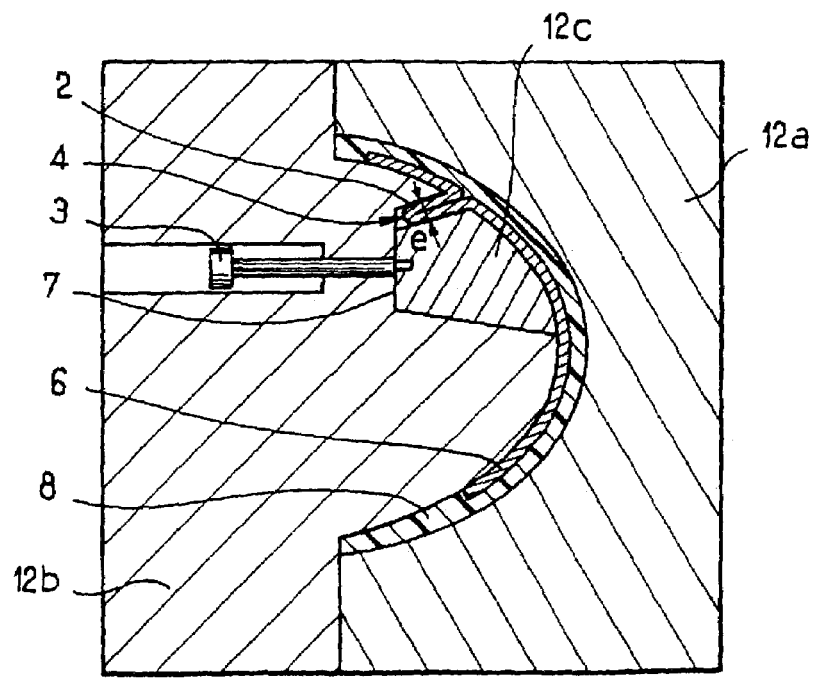
FIG. 2 illustrates a second stage of the method in accordance with the invention.

FIGS. 1 and 2 depict a mould 12 comprising a fixed part 12a constituted here by a concave female die and a movable part having a convex male die 12b and a movable insert 12c. These two parts are movable with respect to one another between a closed position and an open position. The opening/closure of this mould is controlled in translation in a mould opening/closure direction by an actuator (not shown). Between them the fixed part and the movable part define a mould cavity 10.

The movable insert 12c is connected to the male die 12b by an actuator 3 which controls its displacement with respect to the male die 12b by translation substantially following the mould opening/closure direction between an advanced position and a retracted position, as illustrated by the arrow 5.

In the retracted position, the movable insert 12c is inserted into a cavity 7 on the male die, leaving a slot 4 between one 11 of its sides and an adjacent side 9 of the cavity 7 of the male die.

In FIG. 1, the mould 12 is shown in the open position—the fixed part 12a and the movable part 12b, 12c are quite remote from one another. A connecting sheet 6 is disposed resting against the male die 12b and the movable insert 12c, and said sheet is affixed to these. In particular, part of said sheet rests against the side 11 of the movable insert 12c.

The retaining (affixing) means (not shown) of the connecting sheet 6 are considered as known and they may notably include pins or adhesive.

The movable insert 12c is now retracted until it rests against the floor of the cavity 7 on the male die. As depicted in FIG. 2, during this operation the edges 11 and 9 respectively of the movable insert and of the male die draw closer to one another, trapping between them, in the slot 4, a non-terminal folded part 2 of the sheet. This folded part defines a loop 2 or meander. The thickness $e$ of the slot is substantially equivalent to twice the thickness of the sheet 6.

Next the mould 12 is closed, the fixed part 12a making contact with the movable part 12b, 12c. The mould cavity is then filled by pressure-injecting plastics material into it from the fixed part 12a of the mould. The plastics material makes contact with the connecting sheet 6 and adheres to it. Since the width and thickness of the slot 4 are substantially the same as that of the loop and since, moreover, said thickness is very small, the viscosity of the plastics material does not allow it to penetrate said slot 4.

In FIGS. 3 and 4, the part 1, obtained after cooling the plastics material and removal from the mould, defines a facia panel featuring a non-visible concave face 1b and a visible convex face 1a when the facia panel is in situ. These two faces are separated by the thickness of the part 1.

On the non-visible side, the connecting sheet 6 extends over the surface of the facia panel and more particularly over the surface of a support element 8 into which it is integrated. This support element 8 is produced from the plastics material injected into the mould. Although the connecting sheet appears in these drawings to be flush, in reality and bearing in mind the fact that the injection process makes it possible to feed the material from either side of the sheet, for example by additionally injecting plastics material from the male die, to be more precise the sheet is incorporated in the support 8.

After removal from the mould, a continuous cutout 14 was produced forming a flat indent in the part, for example with the help of a laser. This cutout 14 is produced from the non-visible face 1b and extends towards the visible face 1a, though without opening out into said visible face 1a. The cutout 14 passes through the sheet 6 and part of the thickness of the support 8, thereby constituting a mechanical weakening of this support. This leaves a thickness of less than 0.3 millimetre between the floor of said flat indent 14 and the visible face.

The cutout 14 extends between two extremities 14a, 14b disposed facing the loop 2 of the connecting sheet 6. Overall this cutout 14 is U-shaped and defines an embrittled portion in which the sheet is absent.

Between the extremities 14a and 14b, an articulating portion 20 is defined which extends along an articulation axis 30. The articulating portion 20 does not present a cutout in the connecting sheet 6. It could be mechanically weakening, though this is not the case in FIGS. 3 and 4. This articulating portion 20 is overlapped by the connecting sheet 6 which extends continuously on either side of the articulation axis 30.

The articulating portion 20 and the weakened portion 14 define the periphery of a special opening zone 15 which forms a door for an airbag module 28 disposed on the side of the non-visible face 1b.

For ease of comprehension the articulating portion 20 has been symbolised by crosses, and the thickness of the sheet and of the support has been increased with respect to their other dimensions.

It appears in FIG. 4 that the door 15 and in particular its periphery is wholly and strictly enclosed within the zone defined by the external contour of the connecting sheet 6. Accordingly, the connecting sheet 6 is present over the whole of the door and also to either side of its entire periphery. This makes it possible to give the facia panel 1 better resistance to fracture over the door and over the part thereof external to the door. The part 6a of the sheet present over the door is joined to the part that is outside the door—known as the fringe part 6b—via the loop 2 of the connecting sheet and hence via the articulating portion 20.

So that the door is entirely enclosed within the zone defined by the external contour of the connecting sheet, once this sheet has been introduced into the mould it presents a length and breadth greater than those of the door 15. Advantageously, the sheet presents a length L—i.e. perpendicular to the articulation axis—and a breadth l—i.e. parallel to the articulation axis—substantially equivalent to 50 centimetres with a margin of the order of 25%, bearing in mind that the door has generally a length overall of 10 to 15 centimetres and a breadth of 25 to 30 centimetres. Accordingly, the sheet and to be more precise its fringe portion opens out at least 5 centimetres beyond the door, onto the remainder of the facia panel. This makes it possible to obtain a facia panel of satisfactory mechanical strength, bearing in mind that fracturing of the embrittled portion is generally obtained in respect of a pressure applied to the whole of the door of between $10^5$ and $10^7$ Pa (preferably close to $2.10^5$ Pa).

In FIG. 5, under the force of airbag deployment spreading out over the door 15, the facia panel 1 and to be more precise the support 8, ruptures in the weakened portion 14, thereby causing the door 15 to pivot about the articulation axis 30 and to produce a passageway 17 through the facia panel 1. This pivoting of the door about the articulation axis 30 is made possible by the excess length of the connecting sheet 6 formed by the loop 2—which defines a redundant section—which furthermore makes it possible to keep the door 15 with the rest of the facia panel 1. This is because the plastics support 8 is in danger of fracturing in the articulating portion 20 under the strain due to this pivoting action.

FIG. 6 presents an alternative embodiment of the facia panel 1. This panel is distinguished from that shown in FIGS. 1 to 5 by the fact that it is mechanically weakened in the articulating portion 20 as the result of a groove 34 obtained when the part is being moulded and due to the fact that it is referred to a body 35 to which it is attached by welding along a peripheral line 36. The mechanically weakened area 20 is formed by a constriction produced on the visible face 1a. This constriction could be produced on the non-visible face 1b. Its function is to help the door to articulate and to make it possible to omit the redundant section (excess length of sheet) facing the articulating portion, taking account of the reduced thickness of plastic.

Furthermore, the sheet 6 comprises a main part 31 which extends for the entire length—but not necessarily for the entire breadth—of the non-visible face 1b of the part 1. In particular, beyond the articulating portion 20, the sheet extends, in a direction perpendicular to the articulation axis 30, as far as the edge 8a of the part. It even goes on beyond the support 8 via a connecting tongue 32 joined to the rest of the sheet. The main part 31 is fixed to the support 8, in other words joined intimately to this support by virtue of the moulding operation. The connecting tongue 32 is not in contact with the support 8, with the result that it is connected thereto but not fixed onto it.

The sheet 6 and more specifically the connecting tongue is connected to the body 35 via a fixing screw 38. It therefore creates a secondary connecting means between the facia panel body 35 and the part 1. Accordingly, if the force created by the deployment of the airbag were to cause the weld line 36 to fracture, in spite of this, the part 1 would still be retained on the facia panel 35 by the tongue 32.

The part 1 is obtained by arranging the sheet in the mould cavity and leaving part of said sheet sticking out so as to define the tongue, in such a way that the latter is not covered by plastic.

In FIG. 7, the part incorporates a cutout 39 which defines the embrittled portion extending within the thickness of the part, from the non-visible face 1b to the visible face 1a. Unlike in the preceding figures, this cutout 39 does not follow the line 27 normal to the non-visible face 1b (to the support 8). The direction of the cutout is inclined by an angle α to the outside of the door 15, relative to this normal line 27. Here the angle α is approximately 45 degrees; advantageously it will be between 30 degrees and 60 degrees.

Accordingly, if a force F is applied to the door 15 from the side of the visible face 1a, the inclination of the cutout will mean that this door 15 will have no option but to pivot very slightly about the articulation axis 30.

In FIG. 8, a retaining element 42, here a U-shaped bracket, is arranged so as to rest against the non-visible face 1b of the facia panel. It is fixed to the facia panel 1 via fixing means 45 such as screws to the outside of the door 15. This bracket 42 overlaps the cutout 14, such that if a force F is exerted on the visible face 1a of the door 15, the latter will come up against the bracket 42 and cannot be retracted. The door 15 is thus able to open in only one direction.

The airbag module 28 is fixed to a crossbeam 40 adapted in particular to help keep the facia panel 1 in place, but it is not connected to the bracket, which makes it easier to install the various elements on the vehicle. Furthermore the bracket 42 possesses a widened portion 44 which increases in size in the direction of the facia panel. This widened portion disposed opposite where the airbag module 28 will be inflated is used to guide the airbag when it is deployed.

FIG. 9 depicts a connecting sheet 46 which presents a latticework structure. This structure, which may in particular be obtained by the use of a woven or knitted material, produces interstices 46*a* adapted to be filled with the plastics material and thus allowing better adhesion with that material. This sheet is not brittle, but flexible within the temperature range for which the vehicle is designed.

FIG. 10 shows a part 51 having a connecting sheet 56 which presents cells 56*a* filled with the plastics material of the support 8. These cells improve the joint between the connecting sheet 56 and the support 8.

Furthermore, on its visible face 51*a* the part incorporates a complex 53 comprising a covering sheet 52 and a foam layer 54. Accordingly, on its visible face 51*a* it presents a high-quality appearance and a flexible feel and on its non-visible face 51*b* it has the flexible connecting sheet 56.

This part is obtained by arranging the complex 53 in the mould, so that it rests against the female die 12*a*.

If the covering sheet is a self-sealing material, such as polyvinyl chloride, it will be possible to make a quasi-through-cutout, or even a through-cutout.

In the various figures, for ease of comprehension the thickness of the connecting sheet 6, of the support 8 and of the complex 53 have been proportionally increased with respect to the overall dimensions of the facia panel. In reality, such a facia panel will present a width of approximately 1.5 metres, a length (height) of 50 centimetres and a thickness of between 2 and 50 millimetres, around 10%. The connecting sheet advantageously has a thickness of between 0.1 millimetre and 3 millimetres. In the case of a plastics injection-moulded unilayer facia panel, the plastics material will advantageously have a thickness of between 1 and 6 millimetres. In the case of a multilayer facia panel, the covering sheet will advantageously have a thickness of between 0.2 millimetre and 6 millimetres, the thickness of the foam layer or layers will advantageously be between 2 and 50 millimetres and the thickness of the support will be between 1 and 6 millimetres.

It will be readily understood that the invention is by no means restricted to the embodiments illustrated. Thus in FIG. 6, the sheet 6 need not have a tongue 32 coming out of the support 8—notably by slightly modifying the end of the support 8, in particular making it U-shaped—the main thing being to connect the sheet 6 to the body 35. The fixing screw 38 would then pass through the body 35, the support 8 and the sheet 6.

Upon its being introduced into the mould the connecting sheet could already incorporate a cutout defining a flat indent characterised by the absence of the connecting sheet at the place where it is desired to produce the embrittled portion in the finished part.

Likewise it would be possible to provide for two U-shaped cutouts to be made, one on top of the other and running in opposite directions, with the result that overall the flat indent would present the shape of an H: two articulation axes being provided, one at the foot of the H, and the other at the head of the H.

The cutout could be produced as a line of dots, constituted by a series of holes set very close to one another, advantageously with a diameter of between 0.05 millimetre and 0.5 millimetre and spaced between 0 to 2 millimetres apart from one another—preferably between 0.5 and 0.7 millimetre in the case of a polypropylene support.

The cutout could likewise be triangular in section.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed:

1. A composite finished part, comprising:
    a support element made of plastic and having a reduced thickness in comparison to its other dimensions; and
    a connecting sheet joined to the support element throughout a special zone which forms a door for an airbag and is designed to make it possible to create a passageway for the airbag, the connecting sheet extending, and being apparent, throughout the special zone at the non-visible side of the surface of the support element, but not over the whole surface of the non-visible side,
    wherein said special zone is delimited by a periphery constituted by an embrittled portion presenting two extremities and by an articulating portion which defines, between said two extremities, an articulation axis overlapped by the connecting sheet,
    wherein the connecting sheet is present along at least the major part of the embrittled portion on either side of said embrittled portion, and is encompassed in the support element,
    wherein the connecting sheet presents a latticework structure, and
    wherein the connecting sheet comprises a connecting tongue extending beyond the support element, and the tongue of the connecting sheet is connected to a body.

2. The composite finished part of claim 1, wherein the connecting sheet presents a loop facing said articulating portion.

3. The composite finished part of claim 1, wherein the connecting sheet presents a fringe portion which is fixed to the part and surrounds the special zone.

4. The composite finished part of claim 1, wherein the connecting sheet extends, in a direction perpendicular to the articulation axis, beyond the articulating portion and at least as far as the edge of the part.

5. The composite finished part of claim 1, wherein:
    said part presents essentially one visible face and one non-visible face separated by the thickness of the part, and the embrittled portion of the periphery comprises a cutout produced in the thickness of the part, from its non-visible face to its visible face, and
    the cutout is inclined, with respect to the line normal to the non-visible face, towards the outside of the special zone.

6. The composite finished part of claim 5, wherein the angle of the cutout relative to the line normal to the non-visible surface is between 30 degrees and 60 degrees.

7. The composite finished part of claim 1, wherein said part presents essentially one visible face and one non-visible face separated by the thickness of the part, and the embrittled portion of the periphery comprises a continuous cutout made in the thickness of the part, from its non-visible face to its visible face, said part further comprises a retaining element disposed against a section of the non-visible face, overlapping the cutout and fixed on the part to the outside of the special zone.

8. The composite finished part of claim 1, further comprising a body onto which the part is fixed, and the connecting sheet is connected to the body.

9. The composite finished part of claim 1, wherein the support element is a facia panel.

10. The composite finished part of claim 1, wherein the latticework structure is selected from woven and knitted materials.

* * * * *